UNITED STATES PATENT OFFICE.

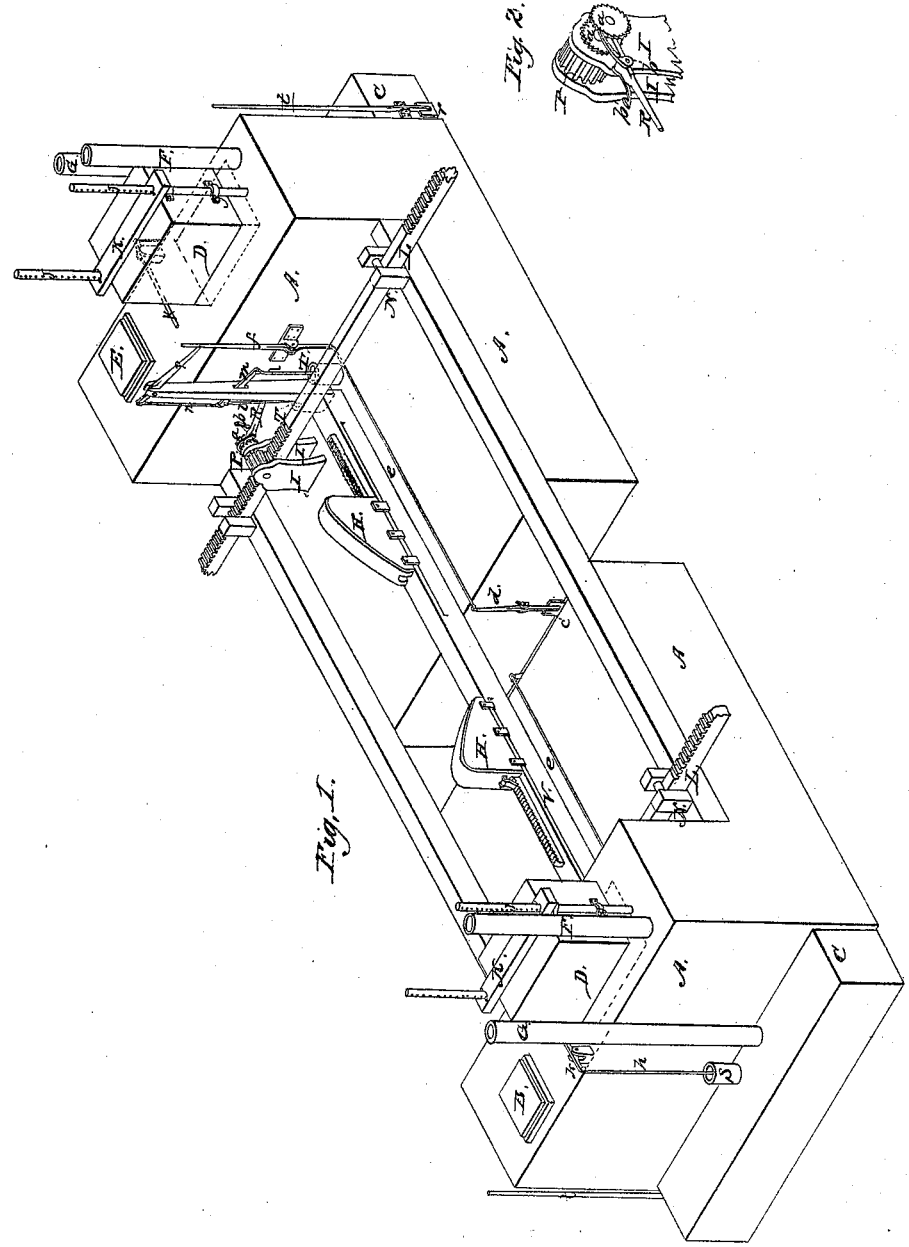

SAMUEL LOVELAND, OF OSWEGO, NEW YORK.

FLOATING DRY-DOCK.

Specification forming part of Letters Patent No. 4,954, dated February 5, 1847; Reissued May 23, 1848, No. 115; Antedated November 7, 1846.

*To all whom it may concern:*

Be it known that I, SAMUEL LOVELAND, of Oswego, in the county of Oswego and State of New York, have invented a new and Improved Floating Sectional Dock for Raising Vessels Out of the Water When Repairs are Required; and I do hereby declare the following to be a full, clear, and exact description of the construction and operation thereof, reference being had to the accompanying drawings, making a part of this specification, in which—

Figure 1, is a perspective view of a section of the dock, and Fig. 2, an enlarged view of a portion of the same detached.

The section consists essentially of two large buoyant chambers A, A, of two balancing chambers C, C; and of two air chambers D, D. The two buoyant chambers A, A, are connected to each other by beams and braces in a strong and suitable manner. Upon the center beam V, are placed the bilge blocks H, H, secured by guides and having a sliding motion, for the purpose of adjusting them to the hull of a vessel resting upon a suitable number of sections of the dock. The bilge blocks are secured in any desired position by pawls taking into a ratchet on the beam V. Each buoyant chamber (A,) has an offset at its outer end, the rise of which is equal to the depth of the buoyant chamber, and its width about one fourth the length of the same. E, E, are hatches on the offsets of the buoyant chambers, for the admission of persons into the chambers when repairs are required. The hatches are closed and corked water tight when the buoyant chambers are in use. F, F, are vertical air pipes connected to the tops of the offsets, for the purpose of supplying air to the buoyant chambers, when they are immersed below the surface of the water. c, c, are valves closing apertures in the inner ends of the buoyant chambers, for the admission of water into the same when they are to be sunk. The valves c, c are operated by a person standing on the offsets of the buoyant chambers A, by means of the lever f, the connecting rod e, and lever d. The lower side of the apertures closed by the valves c, are even with bottoms of the buoyant chambers. The water is pumped out of the buoyant chambers by means of pumps, so arranged that they can be operated under water by persons standing upon the offsets, or upon the air chambers D, D.

T, T, are pump barrels inserted into one of the buoyant chambers, near the offset; the piston rods l, l, are attached to the ends of the lever m, and the rod n, connects this with the working lever p. The other buoyant chamber of the section has pumps arranged in the same manner.

The balancing chambers C, C, are permanently secured to the outer ends of the large buoyant chambers (A,) their bottoms being on a line with each other. At one end of the balancing chambers are apertures for the admission of water closed by the valves r, which are worked by the levers t, t. S, is a pump barrel, (inserted into one of the balancing chambers,)—h, is the piston rod, and k, is the working lever of the pump, for emptying the chamber of water: The other balancing chamber has a pump arranged in the same manner, worked by the lever k. G, G, are air pipes inserted into the balancing chambers,—(rising to the same height of the air pipes F, F:) for the purpose of admitting air into them when they are exhausted of water. The balancing chambers C, C, are for the purpose of preserving the equilibrium of the buoyant chambers A, A, while raising them out of the water. Should one of the buoyant chambers A, rise faster than the other, a small quantity of water discharged from the balancing chamber attached to the other, buoyant chamber of the section will restore their equilibrium. The balancing chambers C, C, are also used for raising the buoyant chambers A, A, out of the water, when repairs are required: This is done by opening the valves c, c, and exhausting the water from the balancing chambers:—their buoyancy elevating the buoyant chambers, and discharging the water in them through the apertures of the valves c, c.

The air chambers D, D, are for the purpose of floating the sections when they are immersed in the water. They slide up and down between the guiding posts J, J, being attached to the same by the loops g, g; the posts J, J, pass through apertures in the ends of the cross pieces K, K, resting on the upper side of the air chambers. The position of the air chambers is regulated by pins inserted into apertures in the grinding posts, above the cross-pieces K. The requisite number of "sections" to raise a vessel out of the water, are connected to each other by the beams L, L; the connecting beams L pass through "bitts" N N, (constructed in the usual manner) attached to the side beams of the buoyant chambers. The connecting beams L, L, have racks, secured at suitable intervals, to their upper sides. I, I, are supports of the pinions P, working into the racks on the upper side of the beams L. R is a lever to which is attached two clicks $b$, $b'$, for operating the pinion P; the click $b$, catching upon the ratchet wheel $a$, (on the axle of the pinion) when the pinion is turned in one direction, and the other click $b'$, upon the ratchet wheel $a'$, when turned in an opposite direction. These pinions, racks, and levers, serve to draw together, or to separate the different sections of the dock. The different valves and pump levers, can be operated by persons standing upon the offsets, or elevated outer ends of the buoyant chambers A, A.

When a vessel is to be raised out of the water, a suitable number of the "sections" are secured to each other by the beams L, L, the valves are opened and the buoyant and balancing chambers are flooded with water until the sections are immersed and suspended by the air chambers D, D. The vessel is floated on to, or over the dock, between the air chambers D, D; or the dock is floated under the vessel. The valves are then closed, and the water is pumped from the buoyant chambers until the vessel and the upper side of the dock, is raised above the surface of the water. The valves $r$, $r$, are first closed, and the valves $c$, $c$, allowed to remain open; the water is then pumped from the balancing chambers until their buoyancy raises the dock and the vessel begins to bear upon it. (Thereby saving much labor, in consequence of the large quantity of water that will thus be discharged from the buoyant chambers (A) as they are raised through the valves $c$, $c$, that would otherwise have to be pumped out.) The valves $c$, $c$, are then closed, and water is pumped from the buoyant chambers A, A, until sufficient buoyancy is produced.

The following are believed to be some of the advantages possessed by my improved floating sectional dock over others now before the public. First. In simplicity and economy of construction. $2^{nd}$. Greater durability—from the facility with which it can be wholly immersed in the water—with the exception of the air chambers D, D, thereby preventing its decay when not in use. $3^{rd}$. In the facility and ease of preserving the equilibrium of the sections, by means of the combination of the balancing chambers C, C, with the buoyant chambers, A, A. $4^{th}$. In the saving of labor in raising the "sections" out of the water, by the aid of the balancing chambers.

Having thus fully described the construction and operation of my improved floating sectional dock, what I claim therein as new and desire to secure by Letters Patent, is—

The combination of the air tight chambers D, D, with the large buoyant chambers A, A, by means of the guiding gage posts J, J, for the purpose of regulating the degree of immersion of the buoyant chambers when they are filled with water, to suit the draft of a vessel, and also for the purpose of suspending the buoyant chambers and the parts attached thereto, when not in use, submerged entirely below the surface of the water, for protecting the same from decay as herein set forth.

SAMUEL LOVELAND.

Witnesses:
  Z. C. ROBBINS,
  GUY C. HUMPHRIES.

[FIRST PRINTED 1913.]